United States Patent
Gu et al.

(10) Patent No.: US 11,037,117 B2
(45) Date of Patent: Jun. 15, 2021

(54) METHOD AND APPARATUS FOR SHARING REGIONAL INFORMATION

(71) Applicant: Advanced New Technologies Co., Ltd., Grand Cayman (KY)

(72) Inventors: Wenjun Gu, Hanzghou (CN); Qin Zhu, Hanzghou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/872,022

(22) Filed: May 11, 2020

(65) Prior Publication Data

US 2020/0273007 A1 Aug. 27, 2020

Related U.S. Application Data

(63) Continuation of application No. 16/384,539, filed on Apr. 15, 2019, now Pat. No. 10,650,362, which is a
(Continued)

(30) Foreign Application Priority Data

Nov. 11, 2016 (CN) .......................... 201611039653.6

(51) Int. Cl.
*G06Q 20/14* (2012.01)
*G06Q 20/08* (2012.01)
(Continued)

(52) U.S. Cl.
CPC ......... *G06Q 20/14* (2013.01); *G06Q 20/0855* (2013.01); *G06Q 20/102* (2013.01); *G06Q 30/04* (2013.01)

(58) Field of Classification Search
CPC ...... G06Q 20/14; G06Q 20/102; G06Q 30/04; G06Q 20/0855; G06Q 20/38
See application file for complete search history.

(56) References Cited

U.S. PATENT DOCUMENTS 5,852,812 A * 12/1998 Reeder ............... G06Q 20/04
705/39
5,963,925 A * 10/1999 Kolling ............... G06Q 20/00
705/26.1
(Continued)

FOREIGN PATENT DOCUMENTS

CN 101211449 7/2008
CN 101853460 10/2010
(Continued)

OTHER PUBLICATIONS

S. Jain and A. M. Asadullah, "Aggregating Bills and Invoices on Cloud for Anytime Anywhere Access: A Sustainable System," 2012 Third International Conference on Services in Emerging Markets, Mysore, 2012, pp. 1-5, doi: 10.1109/ICSEM.2012.8. (Year: 2012).*
(Continued)

*Primary Examiner* — Ashford S Hayles
(74) *Attorney, Agent, or Firm* — Fish & Richardson P.C.

(57) ABSTRACT

A payment bill query request initiated by a user through a third-party payment platform is obtained at a payment platform server. Whether a payment institution has generated a payment bill for the user is determined based on the payment bill query request, where the payment institution does not provide the third-party payment platform with bill generation information. If so, user information associated with the user is obtained by the payment platform server and based on the payment bill. Whether information for notification that the payment institution has generated the payment bill for the user has been pushed to the region that the user belongs to is determined. If not, the information for notification that the payment institution has generated a payment bill is pushed to each user associated with the third-party payment platform within the region that the user
(Continued)

belongs to through an account of the third-party payment platform.

20 Claims, 12 Drawing Sheets

Related U.S. Application Data continuation of application No. PCT/CN2017/109392, filed on Nov. 3, 2017.

(51) Int. Cl.
  *G06Q 20/10* (2012.01)
  *G06Q 30/04* (2012.01)

(56) References Cited

U.S. PATENT DOCUMENTS

| | | | | |
|---|---|---|---|---|
| 6,092,055 | A * | 7/2000 | Owens | G06Q 10/0875 705/34 |
| 6,128,603 | A * | 10/2000 | Dent | G06Q 20/04 705/33 |
| 6,289,322 | B1 * | 9/2001 | Kitchen | G06Q 20/04 705/34 |
| 6,292,789 | B1 * | 9/2001 | Schutzer | G06Q 20/04 705/34 |
| 6,304,857 | B1 | 10/2001 | Heindel et al. | |
| 6,493,685 | B1 * | 12/2002 | Ensel | G06Q 20/102 705/34 |
| 6,578,015 | B1 * | 6/2003 | Haseltine | G06Q 20/102 705/34 |
| 6,826,542 | B1 * | 11/2004 | Virgin | G06Q 20/102 705/34 |
| 7,392,223 | B1 * | 6/2008 | Ganesan | G06Q 20/10 705/34 |
| 7,395,243 | B1 * | 7/2008 | Zielke | G06Q 20/10 705/39 |
| 7,454,192 | B1 * | 11/2008 | Zhu | G06Q 10/00 455/406 |
| 7,606,745 | B1 * | 10/2009 | Brumfield | G06Q 20/14 705/34 |
| 7,752,095 | B1 * | 7/2010 | Laracey | G06Q 40/00 705/34 |
| 7,917,413 | B2 * | 3/2011 | Weiser | H04L 12/1432 705/34 |
| 10,055,603 | B2 * | 8/2018 | Johnson | G06Q 30/04 |
| 10,121,071 | B2 * | 11/2018 | Coleman | G06Q 10/10 |
| 10,650,359 | B2 * | 5/2020 | Burke | G06Q 20/102 |
| 2001/0009002 | A1 * | 7/2001 | Logan | G06Q 20/102 705/34 |
| 2001/0051919 | A1 * | 12/2001 | Mason | G06Q 20/10 705/40 |
| 2002/0013768 | A1 * | 1/2002 | Ganesan | G06Q 20/4014 705/40 |
| 2002/0019808 | A1 * | 2/2002 | Sharma | G06Q 20/02 705/40 |
| 2002/0069163 | A1 * | 6/2002 | Gilbert | G06Q 20/14 705/40 |
| 2002/0069168 | A1 | 6/2002 | Lee et al. | |
| 2003/0220855 | A1 * | 11/2003 | Lam | G06Q 30/04 705/34 |
| 2004/0088254 | A1 * | 5/2004 | Zielke | G06Q 20/102 705/40 |
| 2004/0088255 | A1 * | 5/2004 | Zielke | G06Q 20/102 705/40 |
| 2004/0133514 | A1 * | 7/2004 | Zielke | G06Q 30/04 705/40 |
| 2004/0133515 | A1 * | 7/2004 | McCoy | G06Q 20/102 705/40 |
| 2004/0139009 | A1 * | 7/2004 | Kozee | G06Q 20/10 705/40 |
| 2004/0243524 | A1 * | 12/2004 | Crichlow | G06Q 50/06 705/412 |
| 2006/0195397 | A1 * | 8/2006 | Ganesan | G06Q 40/00 705/40 |
| 2007/0121840 | A1 * | 5/2007 | Ganesan | H04L 29/06 379/114.01 |
| 2007/0265962 | A1 * | 11/2007 | Bowe, Jr. | G06Q 30/04 705/40 |
| 2008/0010193 | A1 | 1/2008 | Rackley, III et al. | |
| 2008/0015985 | A1 * | 1/2008 | Abhari | G06Q 20/10 705/42 |
| 2008/0033878 | A1 * | 2/2008 | Krikorian | G06Q 30/04 705/44 |
| 2008/0046363 | A1 * | 2/2008 | Ali | G06Q 30/04 705/40 |
| 2009/0307117 | A1 * | 12/2009 | Greiner | G06Q 30/04 705/34 |
| 2009/0327111 | A1 * | 12/2009 | Bulawa | H04N 21/4882 705/34 |
| 2010/0250443 | A1 * | 9/2010 | Karlsson | G06Q 20/3821 705/76 |
| 2011/0137762 | A1 * | 6/2011 | Pepe | G06Q 30/06 705/30 |
| 2011/0137776 | A1 * | 6/2011 | Goad | G06Q 30/0282 705/34 |
| 2011/0208650 | A1 * | 8/2011 | McGill | G06Q 30/00 705/40 |
| 2011/0246342 | A1 * | 10/2011 | Gibson | G06Q 20/127 705/34 |
| 2011/0264582 | A1 * | 10/2011 | Kim | G06Q 30/04 705/40 |
| 2012/0226605 | A1 * | 9/2012 | Veerubhotla | G07F 15/12 705/40 |
| 2013/0103580 | A1 * | 4/2013 | Ventura | G06Q 20/102 705/40 |
| 2013/0124376 | A1 * | 5/2013 | Lefebvre | G06Q 20/102 705/34 |
| 2013/0144782 | A1 * | 6/2013 | Eberle | G06Q 30/04 705/40 |
| 2014/0156785 | A1 * | 6/2014 | Kammula | G06Q 20/405 709/217 |
| 2014/0337188 | A1 * | 11/2014 | Bennett | G06Q 20/102 705/30 |
| 2014/0358799 | A1 * | 12/2014 | Kingston | G06Q 30/016 705/304 |
| 2015/0039498 | A1 * | 2/2015 | Weiss | G06Q 30/04 705/40 |
| 2015/0120518 | A1 * | 4/2015 | Bennett | G06Q 20/14 705/30 |
| 2015/0142643 | A1 * | 5/2015 | Ceribelli | G06Q 30/04 705/39 |
| 2015/0221043 | A1 * | 8/2015 | Chithambaram | G06F 40/40 715/703 |
| 2015/0294379 | A1 * | 10/2015 | Giridharan | G06Q 30/04 705/14.23 |
| 2015/0310406 | A1 * | 10/2015 | Anderson | G06Q 30/04 705/40 |
| 2016/0132808 | A1 * | 5/2016 | To | G06Q 10/06315 705/7.25 |
| 2016/0148177 | A1 * | 5/2016 | Best | G06Q 20/363 705/65 |
| 2016/0189121 | A1 | 6/2016 | Best et al. | |
| 2016/0267447 | A1 * | 9/2016 | Davis | G06Q 20/384 |
| 2017/0193469 | A1 * | 7/2017 | Hernandez | G06Q 20/102 |
| 2019/0318354 | A1 * | 10/2019 | Weinflash | G06Q 20/14 |

FOREIGN PATENT DOCUMENTS

| | | |
|---|---|---|
| CN | 102547644 | 7/2012 |
| CN | 102752718 | 10/2012 |
| CN | 103177361 | 6/2013 |
| CN | 103839144 | 6/2014 |
| CN | 105338480 | 2/2016 |
| CN | 105812150 | 7/2016 |
| CN | 107016535 | 8/2017 |
| JP | 2003173341 | 6/2003 |

(56) References Cited

FOREIGN PATENT DOCUMENTS

| | | |
|---|---|---|
| JP | 2005031961 | 2/2005 |
| KR | 20160096396 | 8/2016 |
| TW | 201426587 | 7/2014 |

OTHER PUBLICATIONS

Nambiar, Gopi Krishnan, "System and method to perform a financial action on actionable notifications (mobile/web) with feedback", Aug. 6, 2014, ip.com Journal p. 1-7, (Year: 2014).*
Y. Joung, Y. Tseng, S. Cha, N. Lo, G. Chung and C. Liu, "Motivations, Deployment, and Assessment of Taiwan's E-Invoicing System: An Overview," 2014 47th Hawaii International Conference on System Sciences, Waikoloa, HI, 2014, pp. 2200-2209, doi: 10.1109/HICSS.2014.277. (Year: 2014).*
J. Xu, "Web-Based Billing System Exploits Mature and Emerging Technology," in IT Professional, vol. 13, No. 2, pp. 49-55, Mar.-Apr. 2011, doi: 10.1109/MITP.2010.100. (Year: 2011).*
Crosby et al., "BlockChain Technology: Beyond Bitcoin," Sutardja Center for Entrepreneurship & Technology Technical Report, Oct. 16, 2015, 35 pages.
Extended European Search Report in European No. 17870085.2, dated Jul. 23, 2019, 7 pages.
International Search Report and Written Opinion issued in International Application No. PCT/CN2017/109392 dated Jan. 25, 2018, 10 pages (with English translation).
Nakamoto, "Bitcoin: A Peer-to-Peer Electronic Cash System," www.bitcoin.org, 2005, 9 pages.
PCT International Preliminary Report on Patentability in International Application No. PCT/CN2017/109392, dated May 14, 2019, 9 pages (with English translation).

* cited by examiner

STATE GRID

BEIJING ELECTRIC POWER CORPORATION

Power consumption registration form of smart electricity meter customers

| User name | Small business | Address | 1-107, building No. 2, Boxing Road 9 | Customer number | 1003427548 |
|---|---|---|---|---|---|

Housing property institution (property management institution):

| Meter record | Factory name | Xi'an Liangli | Meter number | 0000485605 | Calibration current | 10 (100) A |
|---|---|---|---|---|---|---|

METHOD AND APPARATUS FOR SHARING REGIONAL INFORMATION

CROSS-REFERENCE TO RELATED APPLICATIONS

This application is a continuation of and claims the priority of U.S. patent application Ser. No. 16/384,539, filed on Apr. 15, 2019, which is a continuation of PCT Application No. PCT/CN2017/109392, filed on Nov. 3, 2017, which claims priority to Chinese Patent Application No. 201611039653.6, filed on Nov. 11, 2016, and each application is hereby incorporated by reference in its entirety.

TECHNICAL FIELD

The present application relates to third-party payment platform technologies and information sharing technologies, and in particular, to a method and an apparatus for sharing regional information.

BACKGROUND

When a user pays related fees to a public utility payment institution (briefly referred to as a payment institution below, such as a gas company, a water company, or State Grid) on a third-party payment platform (such as ALIPAY, TENPAY, WeChat Pay, or LAKALA), because bill generation time of the payment institution is not fixed, or because the payment institution does not allow the third-party payment platform to obtain bill generation information of the payment institution in order to protect customer privacy, the third-party payment platform cannot automatically query a bill by using a regular query mechanism. Because the payment institution cannot provide the third-party payment platform with the bill generation information, the third-party payment platform cannot notify a user of the bill generation information in real time, and the user can only actively query the payment institution on the third-party payment platform for whether a bill is generated. Many users often fail to pay fees in time because they forget to query bills, causing personal credit losses, and bringing a huge obstacle to handling various credit products in the future.

SUMMARY

The present application provides a method for sharing regional information, where the method for sharing regional information includes: obtaining a payment bill query request initiated by a user on a third-party payment platform; obtaining user information based on a payment bill if finding, based on the payment bill query request, that a payment institution has generated the payment bill, where the user information includes a region that the user belongs to; and pushing, by using a third-party payment platform account, information for notifying that the payment institution has generated a payment bill to all users in the region that the user belongs to, if the information for notifying that the payment institution has generated a payment bill has not been pushed to the region that the user belongs to.

The present application provides an apparatus for sharing regional information, where the apparatus for sharing regional information includes: a request acquisition unit, configured to obtain a payment bill query request initiated by a user on a third-party payment platform; a user information acquisition unit, configured to obtain user information based on a payment bill, where the user information includes a region that the user belongs to; and an information push unit, configured to push, by using a third-party payment platform account, information for notifying that a payment institution has generated a payment bill to all users in the region that the user belongs to.

In the implementations of the present application, on a premise that a payment institution does not provide a third-party payment platform with bill generation information, accurate bill generation information of the payment institution is pushed to other users on the third-party payment platform based on a query performed by a certain user by using the third-party payment platform, to prevent the user from missing a payment period.

Certainly, any product or method that implements the present application unnecessarily needs to achieve all the previous advantages.

BRIEF DESCRIPTION OF DRAWINGS

To describe the technical solutions in the implementations of the present application or in the existing technology more clearly, the following briefly describes the accompanying drawings needed for describing the implementations or the existing technology. Apparently, the accompanying drawings in the following description show merely some implementations of the present application, and a person of ordinary skill in the art can still derive other drawings from these accompanying drawings without creative efforts.

DESCRIPTION OF IMPLEMENTATIONS

The following clearly and comprehensively describes the technical solutions in the implementations of the present application with reference to the accompanying drawings in the implementations of the present application. Apparently, the described implementations are merely some rather than all of the implementations of the present application. All other implementations obtained by a person of ordinary skill in the art based on the implementations of the present application without creative efforts shall fall within the protection scope of the present application.

Figure 1:
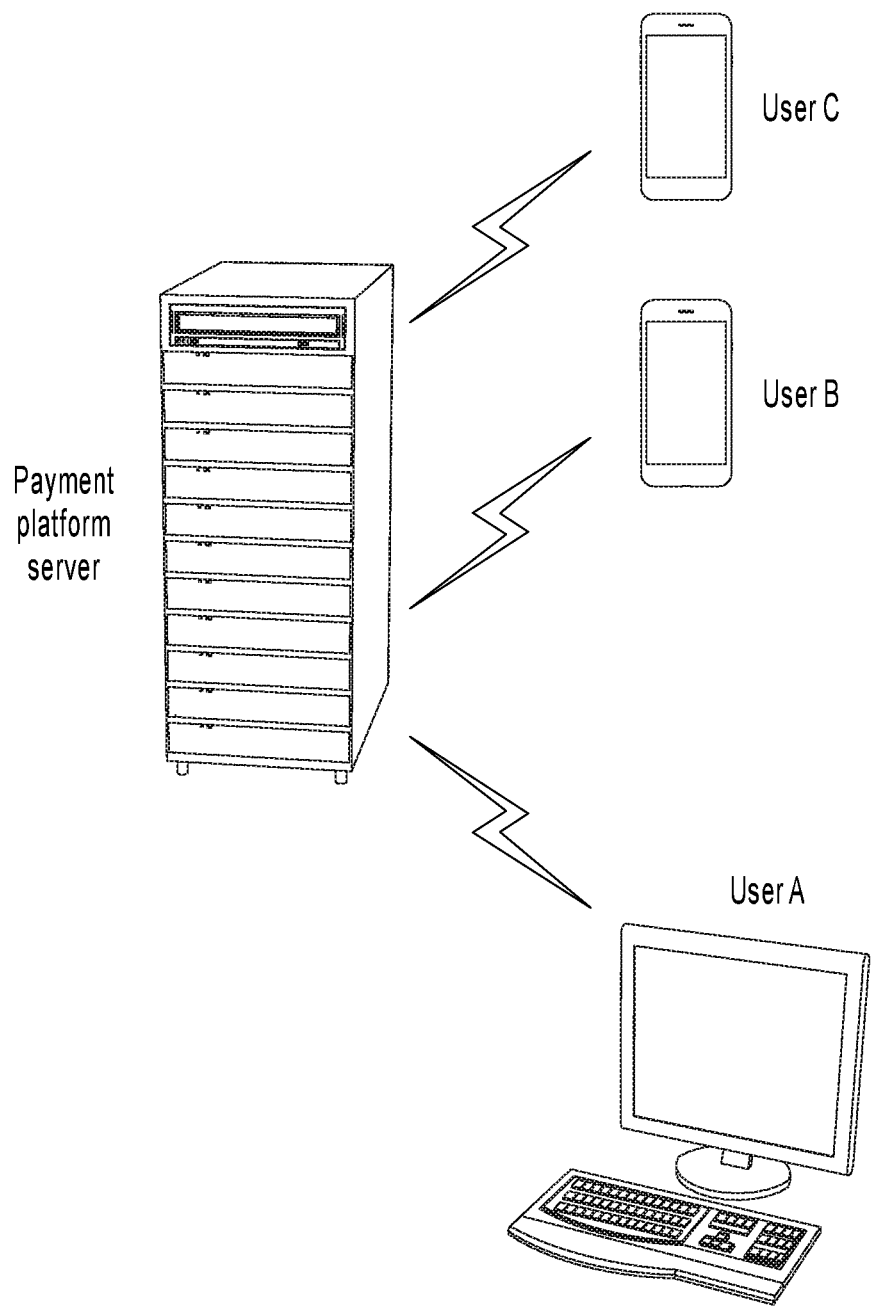
FIG. 1 is a schematic diagram illustrating an application scenario during service implementation, according to the present application.
Figure 2A:
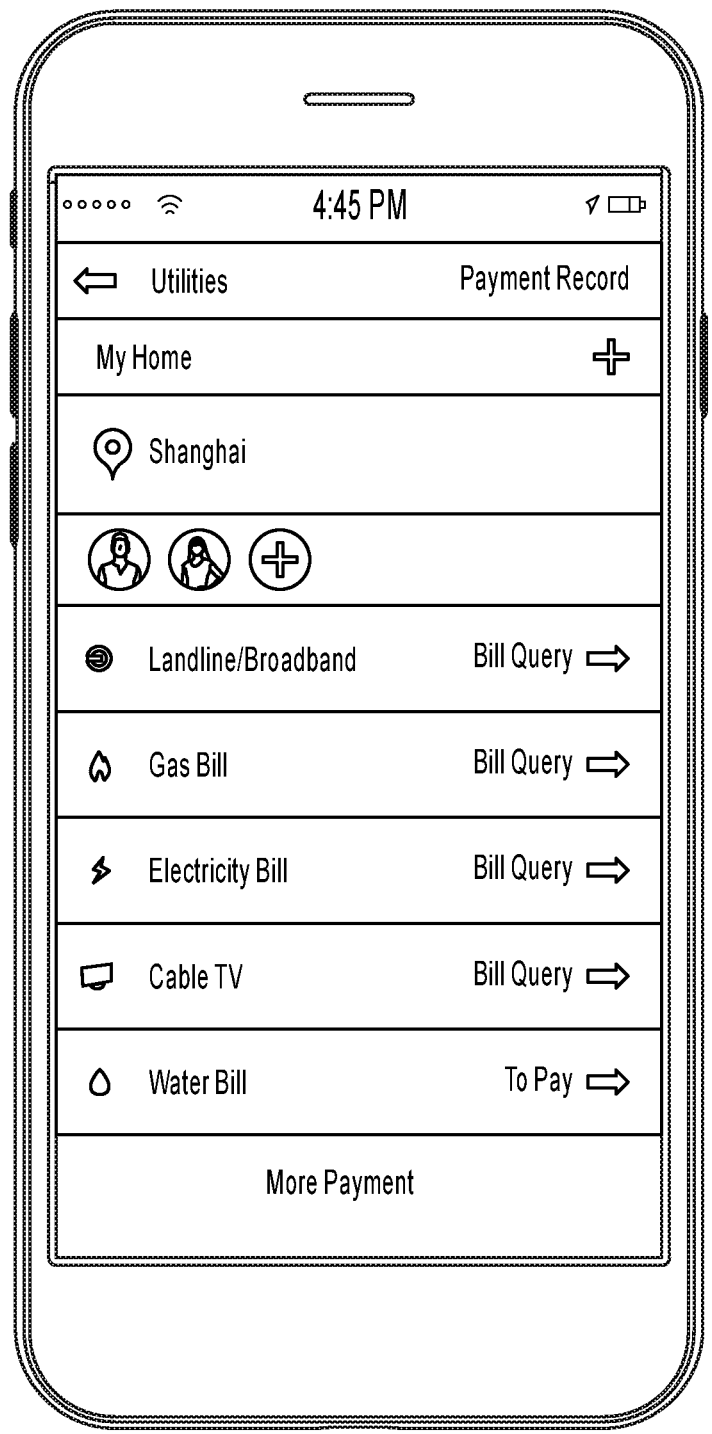
FIG. 2A and FIG. 2B are schematic interface diagrams illustrating querying a gas payment bill by a user.
Figure 2B:
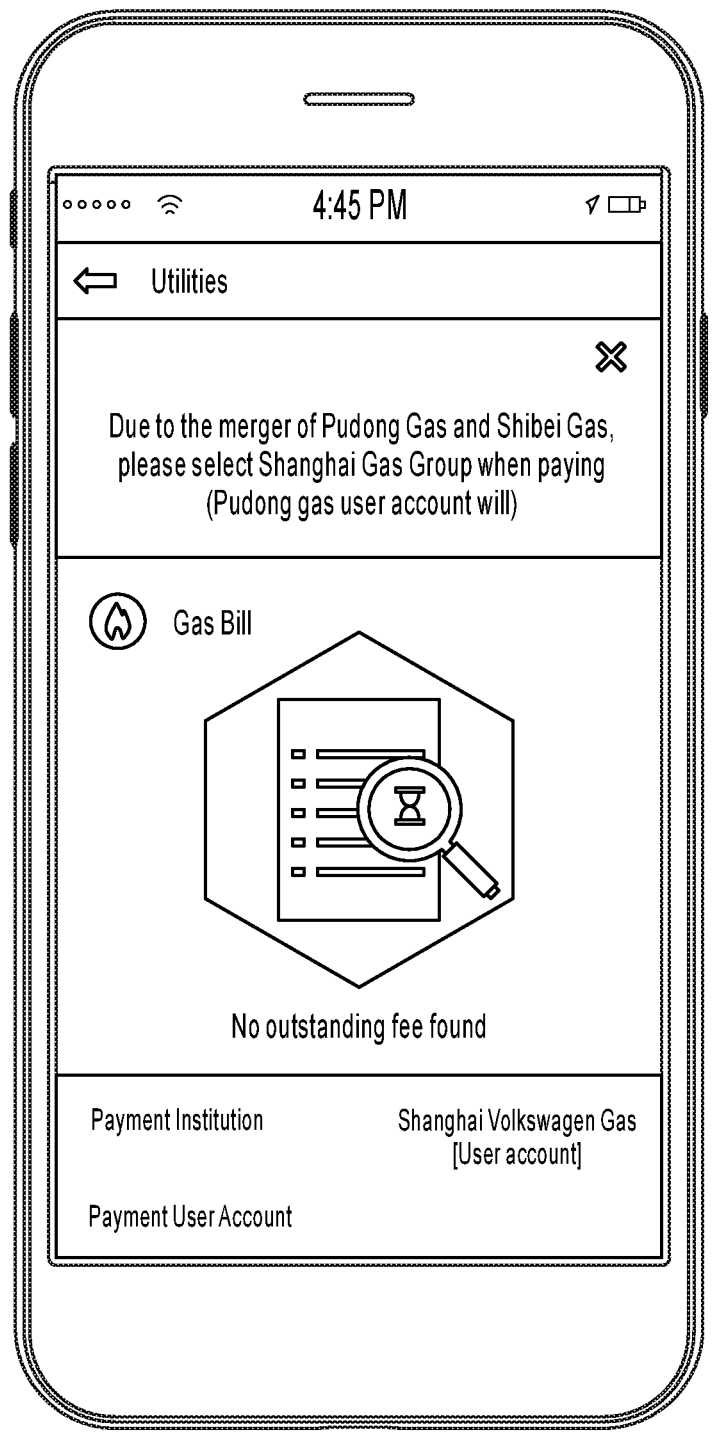

FIG. 1 is a schematic diagram illustrating an application scenario during service implementation, according to the present application. The technical solutions in the implementations of the present application can implement a related payment information push service such as gas bill generation information push, electricity bill generation information push, or water bill generation information push between a user and a payment platform server. In the existing technology, when a related monitoring service is implemented, a client (for example, client A) usually sends a payment bill query request to the payment platform server by using a third-party payment platform, and client A receives a payment bill found by the payment platform server. FIG. 2A and FIG. 2B are schematic interface diagrams illustrating querying a gas payment bill by a user. In FIG. 2A, the user enters a query interface of a third-party payment platform, and the user clicks "Gas Bill" to obtain a query result (the bill is not generated) shown in FIG. 2B. Based on the implementation method, users (including client A, client B, and client C) need to query a payment bill by using a third-party payment platform each time. Many users often fail to pay fees in time because they forget to query payment bills, causing personal credit losses, and bringing a huge obstacle to handling various credit products in the future.

Figure 3:
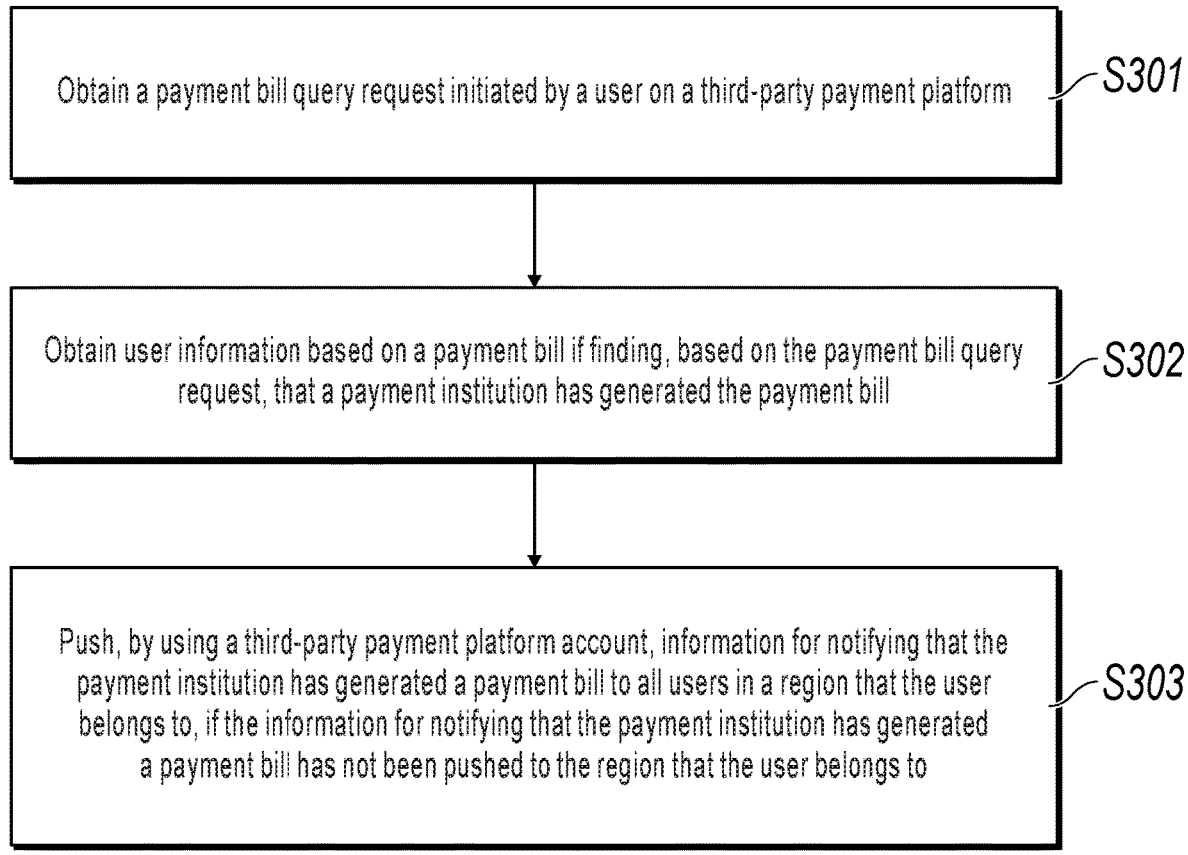
FIG. 3 is a flowchart illustrating a method for sharing regional information, according to an implementation of the present application.

In view of this, an implementation of the present application provides a method for sharing regional information, to push information to a user in time after a payment institution generates a bill. FIG. 3 is a flowchart illustrating a method for sharing regional information, according to an implementation of the present application. The method for sharing regional information is executed by a payment platform server. As shown in FIG. 3, the method for sharing regional information includes the following steps:

S301. Obtain a payment bill query request initiated by a user on a third-party payment platform.

A payment amount bill of a payment service is generally provided by a payment institution (an institution that charges a service fee paid by a user). If a user does not know whether a bill of a certain payment service is generated, the user can initiate a payment bill query request by using a third-party payment platform. The payment bill query request is received by the payment platform server. The payment platform server can query a payment bill from the payment institution based on the payment bill query request.

5302. Obtain user information based on a payment bill if finding, based on the payment bill query request, that a payment institution has generated the payment bill, where the user information includes a region that the user belongs to.

The payment platform server can determine, based on a result of querying the payment bill from the payment institution, whether the payment institution has generated the payment bill. If the payment platform server finds the payment bill of the user, it indicates that the payment institution has generated the payment bill. Otherwise, the payment institution has not generated the payment bill.

When the payment institution has generated the payment bill, the payment platform server can obtain the user information based on the payment bill. The user information includes the region that the user belongs to.

Figure 4:
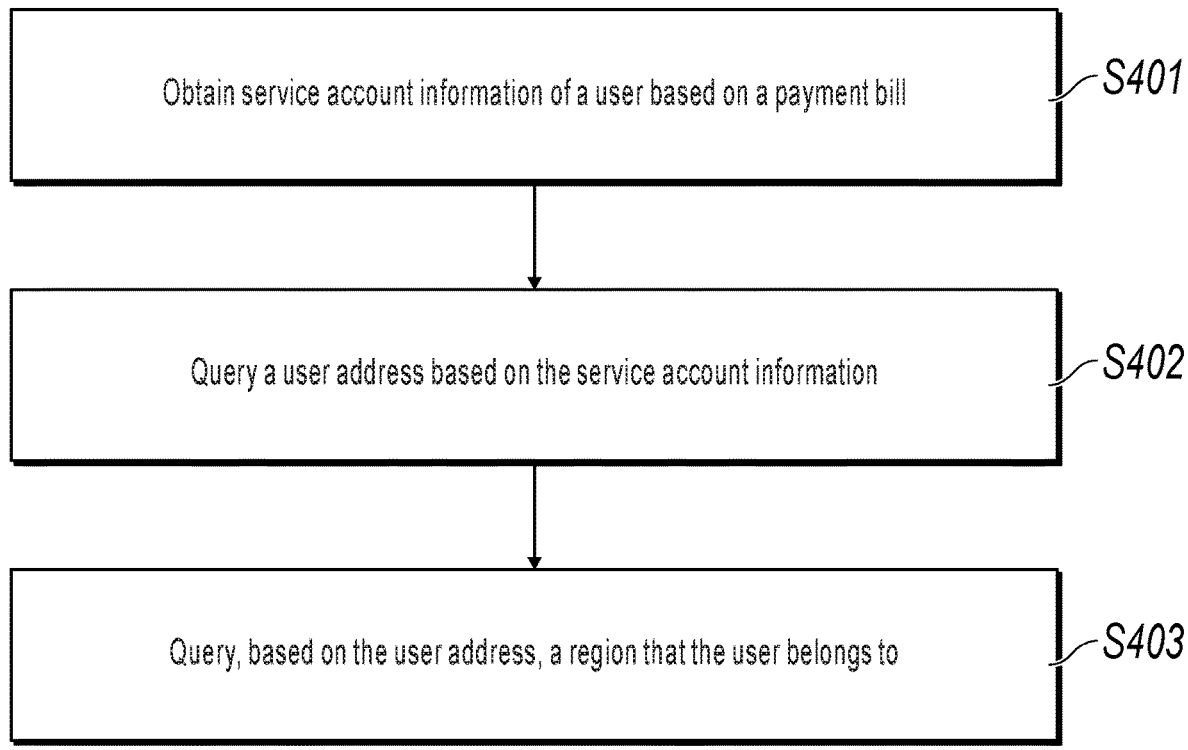
FIG. 4 is a flowchart illustrating a method for obtaining user information, according to an implementation of the present application.

In an implementation, as shown in FIG. 4, the obtaining user information based on a payment bill can include the following steps:

S401. Obtain service account information of the user based on the payment bill.

The payment bill records the server account information of the user. For example, a payment bill of an electricity payment service records a customer number of a user: 1003427548. The customer number is the service account information.

S402. Query a user address based on the service account information.

Figure 5:
FIG. 5 is a schematic diagram illustrating querying a region that a user belongs to, according to an implementation of the present application.

The service account information is used to identify different users, and the user address can be queried from the payment institution by using the service account information. As shown in FIG. 5, the payment institution records the user address corresponding to the service account information: 1-107, building No. 2, Boxing Road 9.

S403. Query, based on the user address, the region that the user belongs to.

The region that the user belongs to can be queried based on the user address. The region that the user belongs to can be a community or a street that the user lives in, an administrative region that the user belongs to, etc. With reference to FIG. 5, for a user whose user address is 1-107, building No. 2, Boxing Road 9, a corresponding community that the user lives in is *** International Industrial Park.

S303. Push, by using a third-party payment platform account, information for notifying that the payment institution has generated a payment bill to all users in the region that the user belongs to, if the information for notifying that the payment institution has generated a payment bill has not been pushed to the region that the user belongs to.

If another user has initiated a payment bill query request on a third-party payment platform and a payment bill has been found before a certain user initiates a payment bill query request on the third-party payment platform, the payment platform server possibly has pushed, by using the third-party payment platform, information that a current-period payment bill has been generated to a region that the user belongs to. In this case, in the present application, the information that a current-period payment bill has been generated does not need to be pushed, by using a third-party payment platform account, to all users in the region that the user belongs to. Therefore, the payment platform server needs to first determine whether the information that a current-period payment bill has been generated has been pushed to the region that the user belongs to. If the payment platform server has not push the information that a current-period payment bill has been generated to the region that the user belongs to, the payment platform server can push, by using the third-party payment platform account, the information that a current-period payment bill has been generated to all the users in the region that the user belongs to.

In this implementation of the present application, on a premise that a payment institution does not provide a third-party payment platform with bill generation information, accurate bill generation information of the payment institution is pushed to other users on the third-party payment platform based on a query performed by a certain user by using the third-party payment platform, to prevent the user from missing a payment period.

The following uses ALIPAY in third-party payment platforms as an example, and describes the present application with reference to a specific example.

ALIPAY has a large number of users, and a payment account of a user can be associated with an address of the user. The user can log in to ALIPAY by using a device such as a mobile device or a PC to perform a service operation, for example, to query a payment bill or make a payment.

Figure 6:
FIG. 6 is a schematic diagram illustrating pushing regional information on ALIPAY, according to an implementation of the present application.

As shown in FIG. 6, user A initiates a payment bill query request by using ALIPAY, to query information such as a current-period payment amount and a current-period payment date. After receiving the payment bill query request, a server end queries a current-period payment bill of user A from a payment institution based on the payment bill query request. If finding the current-period payment bill, the server end can know that the payment institution has generated the bill, and the server end can store the current-period payment bill of user A. The server end can first query a service account of user A (for example, an electricity purchase card customer number of user A: 1003427548) based on the payment bill; then can query a user address of user A based on the service account; and finally can query, based on the user address, a region that user A belongs to. If user A is the first user who queries a current-period payment bill in the region that user A belongs to, the server end can push information to another ALIPAY user in the region that user A belongs to, to notify the another ALIPAY user that the charging institution has generated a bill and a payment can be made. If the user A is not the first user who queries a current-period payment bill in the region that user A belongs to, the server possibly has pushed bill generation information to ALIPAY users in the region that user A belongs to, and the server end can find that the information that a current-period payment bill has been generated has been pushed. In this case, the server end does not need to push the bill generation information to the ALIPAY users in the region that user A belongs to.

Based on the same inventive concept as the method for sharing regional information, the present application provides an apparatus for sharing regional information, as described in the following implementation. A problem resolving principle of the apparatus for sharing regional information is similar to a problem resolving principle of the method for sharing regional information. Therefore, for implementation of the apparatus for sharing regional information, references can be made to implementation of the method for sharing regional information, and details are omitted for simplicity.

Figure 7:
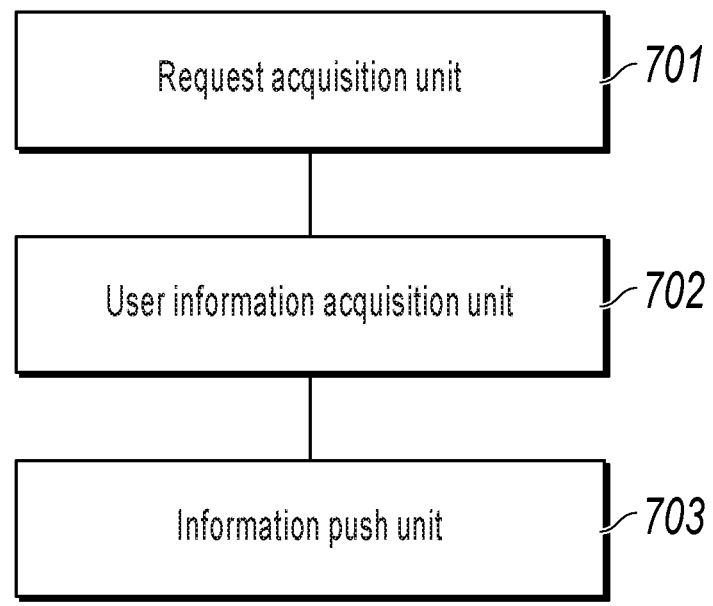
FIG. 7 is a structural block diagram illustrating an apparatus for sharing regional information, according to an implementation of the present application.

FIG. 7 is a structural block diagram illustrating an apparatus for sharing regional information, according to an implementation of the present application. The apparatus for sharing regional information can be a third-party payment platform server. As shown in FIG. 7, the apparatus for sharing regional information includes a request acquisition unit 701, a user information acquisition unit 702, and an information push unit 703.

The request acquisition unit 701 is configured to obtain a payment bill query request initiated by a user on a third-party payment platform.

The user information acquisition unit 702 is configured to obtain user information based on a payment bill, where the user information includes a region that the user belongs to. During specific implementation, the region that the user belongs to can be a community or a street that the user lives in, an administrative region that the user belongs to, etc.

The information push unit 703 is configured to push, by using a third-party payment platform account, information for notifying that a payment institution has generated a payment bill to all users in the region that the user belongs to.

Figure 8:
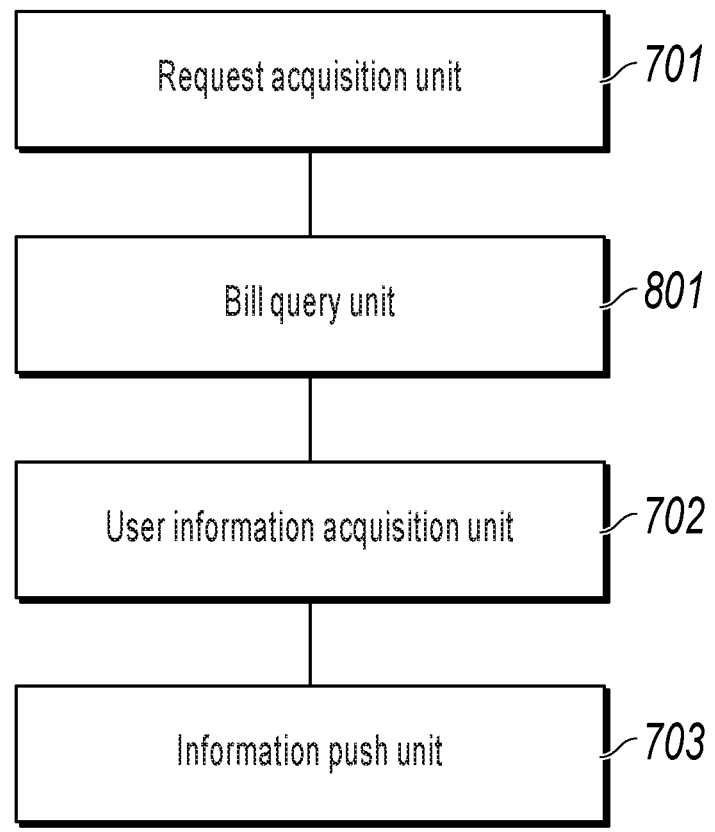
FIG. 8 is a structural block diagram illustrating an apparatus for sharing regional information, according to an implementation of the present application.

In an implementation, as shown in FIG. 8, the apparatus for sharing regional information further includes a bill query unit 801, configured to query the payment bill based on the payment bill query request.

Figure 9:
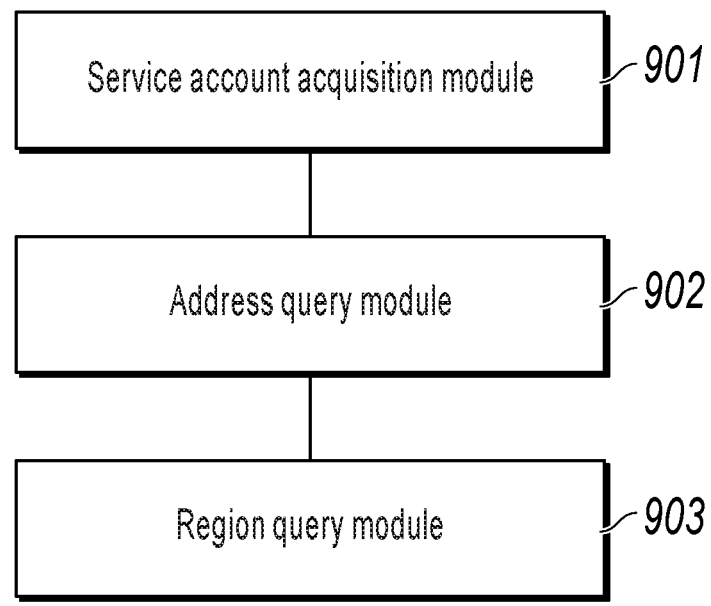
FIG. 9 is a structural block diagram illustrating a user information acquisition unit, according to an implementation of the present application.

In an implementation, as shown in FIG. 9, the user information acquisition unit 702 includes: a service account acquisition module 901, configured to obtain service account information of the user based on the payment bill; an address query module 902, configured to query a user address based on the service account information; and a region query module 903, configured to query, based on the user address, the region that the user belongs to.

Figure 10:
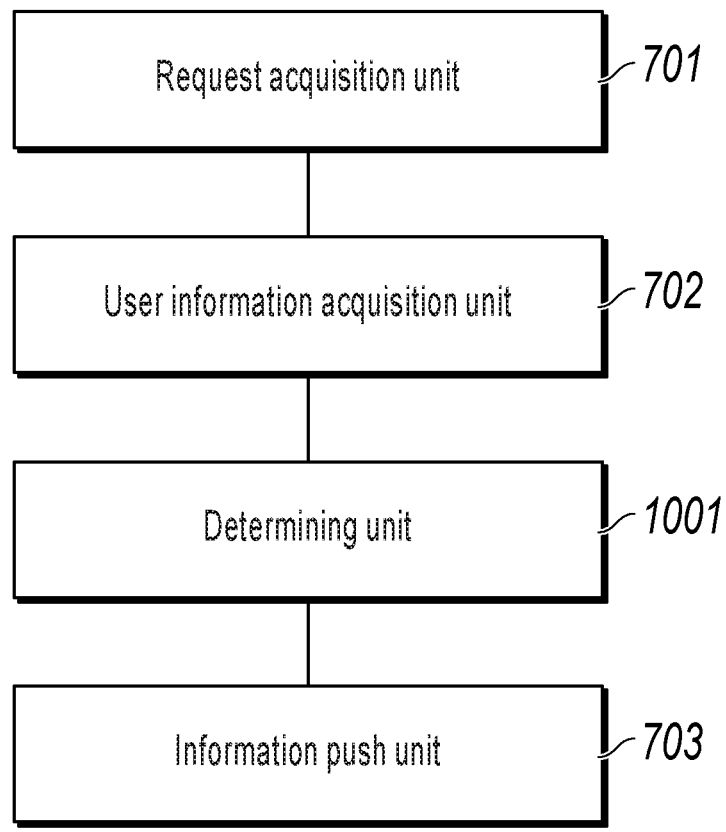
FIG. 10 is a structural block diagram illustrating an apparatus for sharing regional information, according to an implementation of the present application.

In an implementation, as shown in FIG. 10, the apparatus for sharing regional information further includes: a determining unit 1001, configured to determine whether the information for notifying that the payment institution has generated a payment bill has been pushed to the region that the user belongs to.

In this implementation of the present application, on a premise that a payment institution does not provide a third-party payment platform with bill generation information, accurate bill generation information of the payment institution is pushed to other users on the third-party payment platform based on a query performed by a certain user by using the third-party payment platform, to prevent the user from missing a payment period.

A person skilled in the art should understand that the implementations of the present application can be provided as a method, a system, or a computer program product. Therefore, the present application can use hardware only implementations, software only implementations, or implementations with a combination of software and hardware. In addition, the present application can use a form of a computer program product that is implemented on one or more computer-usable storage media (including but not limited to a magnetic disk memory, a CD-ROM, an optical memory, etc.) that include computer-usable program code.

The present application is described with reference to the flowcharts and/or block diagrams of the method, the device (system), and the computer program product according to the implementations of the present application. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions can alternatively be stored in a computer-readable memory that can instruct the computer or the another programmable data processing device to work in a specific way, so that the instructions stored in the computer-readable memory generate an artifact that includes an instruction apparatus. The instruction apparatus implements a specified function in one or more processes in the flowcharts and/or in one or more blocks in the block diagrams.

These computer program instructions can alternatively be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Specific implementations are used in the present application to describe the principles and implementations of the present application. The previous descriptions of the implementations are merely intended to help understand the method and the core idea of the present application. In addition, a person of ordinary skill in the art can make a change to the present application in terms of a specific implementation and an application scope based on the idea of the present application. In conclusion, the content of the present specification shall not be construed as a limitation to the present application.

Figure 11:
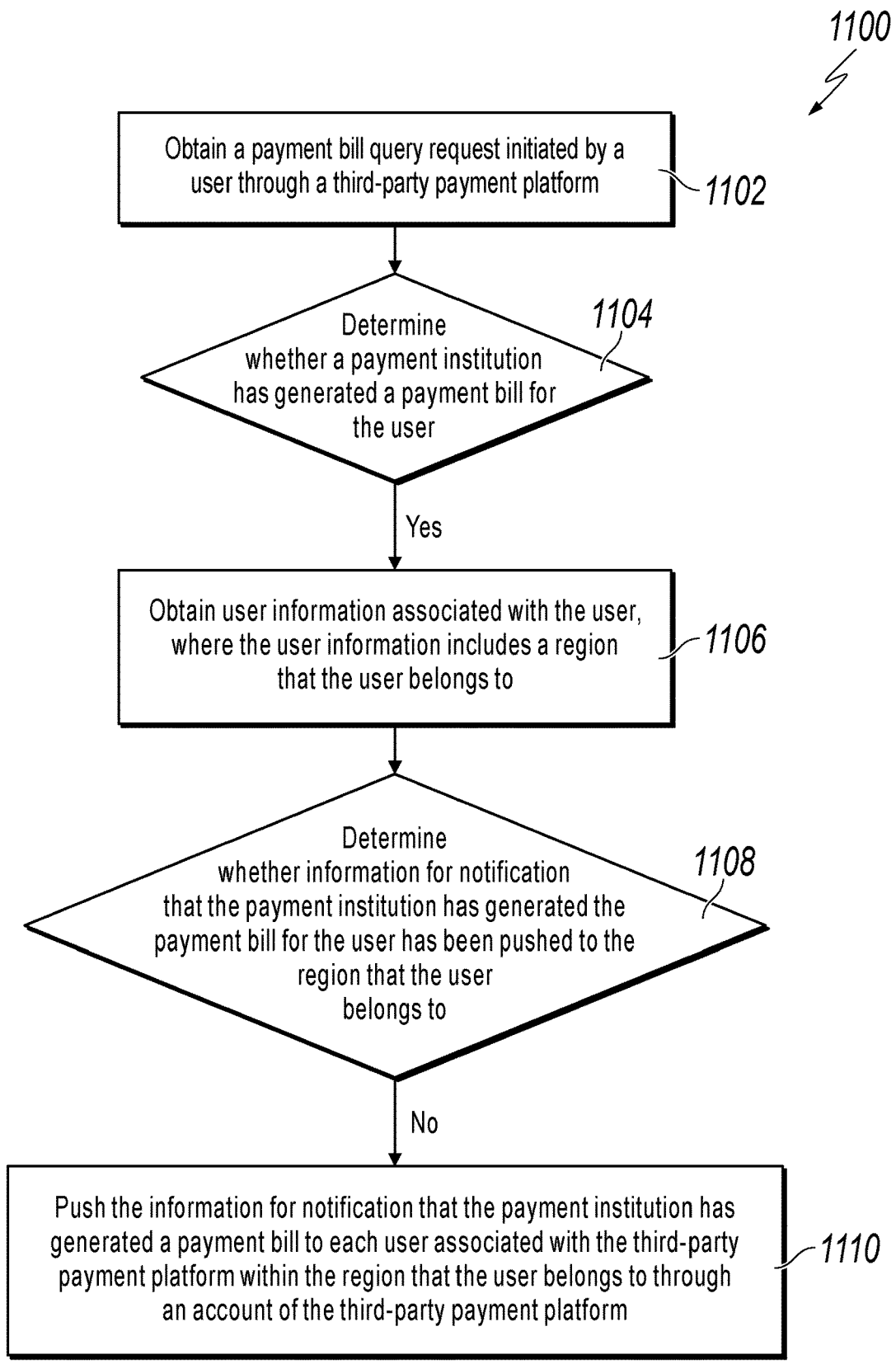
FIG. 11 is a flowchart illustrating an example of a computer-implemented method for querying and pushing payment bill information to a user based on a region the user belongs to, according to an implementation of the present disclosure.

FIG. 11 is a flowchart illustrating an example of a computer-implemented method 1100 for querying and pushing payment bill information to a user based on a region the user belongs to, according to an implementation of the present disclosure. For clarity of presentation, the description that follows generally describes method 1100 in the context of the other figures in this description. However, it will be understood that method 1100 can be performed, for example, by any system, environment, software, and hardware, or a combination of systems, environments, software, and hardware, as appropriate. In some implementations, various steps of method 1100 can be run in parallel, in combination, in loops, or in any order.

At 1102, a payment bill query request initiated by a user through a third-party payment platform is obtained at a payment platform server. In some implementations, the user initiates the payment bill query request in response to whether the payment bill associated with a payment service is generated for the user is unknown to the user. From 1102, method 1100 proceeds to 1104.

At 1104, a determination is made as to whether a payment institution has generated a payment bill for the user is determined based on the payment bill query request. In some implementations, determining whether the payment institution has generated the payment bill for the user includes querying for the payment bill from the payment institution. If the payment bill for the user is found, a determination is made that the payment institution has generated the payment bill. If it is determined that that the payment institution has generated the payment bill for the user, method 1100 proceeds to 1106.

At 1106, user information associated with the user is obtained by the payment platform server and based on the payment bill, where the user information includes a region that the user belongs to. In some implementations, the region that the user belongs to is an area where the user resides or is an administrative region.

In some implementations, obtaining the user information includes obtaining, based on the payment bill, service account information associated with the user; querying a user address based on the service account information; and querying, based on the user address, the region that the user belongs to. In such implementations, the payment bill records the service account information associated with the user, where the service account information is used to identify different users. From 1106, method 1100 proceeds to 1108.

At 1108, a determination is made as to whether information for notification that the payment institution has generated the payment bill for the user has been pushed to the region that the user belongs to.

In some implementations, determining whether information for notification that the payment institution has generated the payment bill for the user has been pushed to the region that the user belongs to includes determining whether the user is a first user initiating the payment bill query request within the region that the user belongs to. If it is determined that that the information for notification that the payment institution has generated the payment bill for the user has not been pushed to the region that the user belongs to, method 1100 proceeds to 1110.

At 1110, the information for notification that the payment institution has generated a payment bill is pushed to each user associated with the third-party payment platform within the region that the user belongs to through an account of the third-party payment platform. After 1110, method 1100 can stop.

Implementations of the present application can provide one or more technical effects or solutions to solve technical problems in querying and pushing payment bill information to users belonging to a same region. Increasing numbers of users make payments (for example, public utility institutions—such as, gas, water, Internet, or mobile communications) through a third-party payment platforms. However, because bill generation times of such institutions is not fixed, and some of the institutions do not allow the third-party payment platform to obtain bill generation information associated with their institutions to protect customer privacy, the third-party payment platform cannot automatically query a bill by using a regular query mechanism. Because the payment institution does not provide the third-party payment platform with the bill generation information, the third-party payment platform cannot notify a user of the bill generation information (either in real-time or non-real-time), and the user can only actively query the payment institution on the third-party payment platform to determine whether a bill has been generated. As such, using conventional payment bill information notification methods, many users often fail to pay bills in a timely manner (for example, due to a failure to consistently query bills), which can cause personal credit losses and participation with future credit products. The described methodology provides a secure technique to bypass problems with the conventional methods, and to provide a more efficient and unified solution for users to query for and to receive payment bill notification information.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   obtaining, at a payment platform server, a payment bill query request associated with a user of a third-party payment platform, wherein the third-party payment platform is configured to query payment bills from a plurality of payment institutions, determining, by the payment platform server based on a result of querying the payment bill from a payment institution of the plurality of payment institutions based on the payment bill query request, that the payment institution has generated the payment bill, in response to determining that the payment institution has generated the payment bill: obtaining, by the payment platform server and based on the payment bill, user information indicative of a region, determining, by the payment platform server, that a notification indicating that the payment institution has generated the payment bill has been failed to be pushed to the region, and in response to determining that the notification that the payment institution has generated the payment bill has not been failed to be pushed to the region:

pushing, by the payment platform server, the notification that the payment institution has generated the payment bill to a user account of the third-party payment platform within the region to which the user belongs.

2. The computer-implemented method of claim 1, wherein the user initiates the payment bill query request in response to that the payment bill associated with a payment service is generated for the user is unknown to the user.

3. The computer-implemented method of claim 1, wherein determining that the payment institution has generated the payment bill for the user comprises:
   querying for the payment bill from the payment institution;
   determining that the payment bill for the user is found; and
   in response to determining that the payment bill for the user is found, determining that the payment institution has generated the payment bill.

4. The computer-implemented method of claim 1, wherein obtaining the user information comprises:
   obtaining, based on the payment bill, service account information associated with the user;
   querying a user address based on the service account information; and
   querying, based on the user address, the region that the user belongs to.

5. The computer-implemented method of claim 4, wherein the payment bill records the service account information associated with the user, and wherein the service account information is used to identify different users.

6. The computer-implemented method of claim 1, wherein the region that the user belongs to is an area where the user resides or is an administrative region.

7. The computer-implemented method of claim 1, wherein determining that the notification that the payment institution has generated the payment bill for the user has been pushed to the region that the user belongs to comprises determining that the user is a first user initiating the payment bill query request within the region that the user belongs to.

8. A non-transitory, computer-readable medium storing one or more instructions executable by a computer system to perform operations comprising:
   obtaining, at a payment platform server, a payment bill query request associated with a user of a third-party payment platform, wherein the third-party payment platform is configured to query payment bills from a plurality of payment institutions, determining, by the payment platform server based on a result of querying the payment bill from the payment institution of the plurality of payment institutions based on the payment bill query request, that the payment institution has generated the payment bill, in response to determining that the payment institution has generated the payment bill: obtaining, by the payment platform server and based on the payment bill, user information indicative of a region, determining, by the payment platform server, that a notification indicating that the payment institution has generated the payment bill has been failed to be pushed to the region, and in response to determining that the notification that the payment institution has generated the payment bill has not been failed to be pushed to the region:

pushing, by the payment platform server, the notification that the payment institution has generated the payment bill to a user account of the third-party payment platform within the region to which the user belongs.

9. The non-transitory, computer-readable medium of claim 8, wherein the user initiates the payment bill query request in response to that the payment bill associated with a payment service is generated for the user is unknown to the user.

10. The non-transitory, computer-readable medium of claim 8, wherein determining that the payment institution has generated the payment bill for the user comprises:
    querying for the payment bill from the payment institution;
    determining that the payment bill for the user is found; and
    in response to determining that the payment bill for the user is found, determining that the payment institution has generated the payment bill.

11. The non-transitory, computer-readable medium of claim 8, wherein obtaining the user information comprises:
    obtaining, based on the payment bill, service account information associated with the user;
    querying a user address based on the service account information; and
    querying, based on the user address, the region that the user belongs to.

12. The non-transitory, computer-readable medium of claim 11, wherein the payment bill records the service account information associated with the user, and wherein the service account information is used to identify different users.

13. The non-transitory, computer-readable medium of claim 8, wherein the region that the user belongs to is an area where the user resides or is an administrative region.

14. The non-transitory, computer-readable medium of claim 8, wherein determining that the notification that the payment institution has generated the payment bill for the user has been pushed to the region that the user belongs to comprises determining that the user is a first user initiating the payment bill query request within the region that the user belongs to.

15. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:

obtaining, at a payment platform server, a payment bill query request associated with a user of a third-party payment platform, wherein the third-party payment platform is configured to query payment bills from a plurality of payment institutions, determining, by the payment platform server based on a result of querying the payment bill from a payment institution of the plurality of payment institutions based on the payment bill query request, that the payment institution has generated the payment bill, in response to determining that the payment institution has generated the payment bill: obtaining, by the payment platform server and based on the payment bill, user information indicative of a region, determining, by the payment platform server, that a notification indicating that the payment institution has generated the payment bill has been failed to be pushed to the region, and in response to determining that the notification that the payment institution has generated the payment bill has not been failed to be pushed to the region:

pushing, by the payment platform server, the notification that the payment institution has generated the payment bill to a user account of the third-party payment platform within the region to which the user belongs.

16. The computer-implemented system of claim 15, wherein the user initiates the payment bill query request in response to that the payment bill associated with a payment service is generated for the user is unknown to the user.

17. The computer-implemented system of claim 15, wherein
    determining that the payment institution has generated the payment bill for the user comprises: querying for the payment bill from the payment institution;
    determining that the payment bill for the user is found; and
    in response to determining that the payment bill for the user is found, determining that the payment institution has generated the payment bill.

18. The computer-implemented system of claim 15, wherein
    obtaining the user information comprises:
    obtaining, based on the payment bill, service account information associated with the user;
    querying a user address based on the service account information; and
    querying, based on the user address, the region that the user belongs to.

19. The computer-implemented system of claim 18, wherein the payment bill records the service account information associated with the user, and wherein the service account information is used to identify different users.

20. The computer-implemented system of claim 15, wherein the region that the user belongs to is an area where the user resides or is an administrative region.

* * * * *

UNITED STATES PATENT AND TRADEMARK OFFICE
CERTIFICATE OF CORRECTION

| | |
|---|---|
| PATENT NO. | : 11,037,117 B2 |
| APPLICATION NO. | : 16/872022 |
| DATED | : June 15, 2021 |
| INVENTOR(S) | : Gu et al. |

It is certified that error appears in the above-identified patent and that said Letters Patent is hereby corrected as shown below:

On the Title Page

Item (72), delete "Hanzghou" and insert -- Hangzhou --, therefor.

Signed and Sealed this
Ninth Day of November, 2021

Drew Hirshfeld
*Performing the Functions and Duties of the
Under Secretary of Commerce for Intellectual Property and
Director of the United States Patent and Trademark Office*